(12) United States Patent
Bhakta

(10) Patent No.: US 10,107,467 B2
(45) Date of Patent: Oct. 23, 2018

(54) METHODS AND APPARATUS FOR ILLUMINATION WITH DMD AND LASER MODULATED ADAPTIVE BEAM SHAPING

(71) Applicant: Texas Instruments Incorporated, Dallas, TX (US)

(72) Inventor: Vikrant R. Bhakta, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 373 days.

(21) Appl. No.: 14/678,950

(22) Filed: Apr. 4, 2015

(65) Prior Publication Data

US 2015/0377446 A1    Dec. 31, 2015

Related U.S. Application Data

(60) Provisional application No. 62/017,483, filed on Jun. 26, 2014.

(51) Int. Cl.

| | |
|---|---|
| *F21V 11/00* | (2015.01) |
| *F21S 41/675* | (2018.01) |
| *F21S 8/10* | (2006.01) |
| *G02B 26/08* | (2006.01) |
| *G02B 27/09* | (2006.01) |
| *F21S 41/14* | (2018.01) |
| *F21S 41/65* | (2018.01) |

(52) U.S. Cl.
CPC ............ *F21S 41/675* (2018.01); *F21S 41/14* (2018.01); *F21S 48/1145* (2013.01); *F21S 48/1757* (2013.01); *G02B 26/0833* (2013.01); *G02B 27/0933* (2013.01); *F21S 41/65* (2018.01); *F21S 48/1736* (2013.01)

(58) Field of Classification Search
CPC ...... F21S 48/12; F21S 41/675; G02B 26/0833
See application file for complete search history.

(56) References Cited

U.S. PATENT DOCUMENTS

| | | | | |
|---|---|---|---|---|
| 5,422,792 A | * | 6/1995 | Neumann ............ | B60Q 1/0011 362/554 |
| 2007/0206390 A1 | * | 9/2007 | Brukilacchio ....... | G02B 6/4298 362/555 |

(Continued)

*Primary Examiner* — Evan Dzierzynski
(74) *Attorney, Agent, or Firm* — Michael A. Davis, Jr.; Charles A. Brill; Frank D. Cimino

(57) ABSTRACT

Illumination with DMD and laser modulated adaptive beam shaping. A DMD illumination system includes a plurality of laser illumination sources, each of the plurality of illumination sources directing light onto a phosphor arranged between the plurality of laser illumination sources and a digital micro-mirror device; control circuitry coupled to the plurality of illumination sources and to the digital micro-mirror device configured for controlling the position of the array of micro-mirrors and further configured for providing control signals to each of the plurality of laser illumination sources, so that the light from the plurality of laser illumination sources strikes the phosphor and is then directed from the phosphor onto the array of micro-mirrors in the digital micro-mirror device when the micro-mirrors are at a predetermined position, and the light is reflected from the digital micro-mirror device and out of the system. Methods are also disclosed.

23 Claims, 15 Drawing Sheets

(56) References Cited

U.S. PATENT DOCUMENTS

| | | | |
|---|---|---|---|
| 2011/0267382 A1* | 11/2011 | Fergason | G02F 1/1336 |
| | | | 345/690 |
| 2013/0058114 A1 | 3/2013 | Reiners | |
| 2014/0071706 A1* | 3/2014 | Yagi | F21S 48/125 |
| | | | 362/520 |
| 2014/0306878 A1 | 10/2014 | Bhakta | |
| 2015/0369437 A1* | 12/2015 | Reinprecht | F21S 48/1225 |
| | | | 362/510 |

* cited by examiner

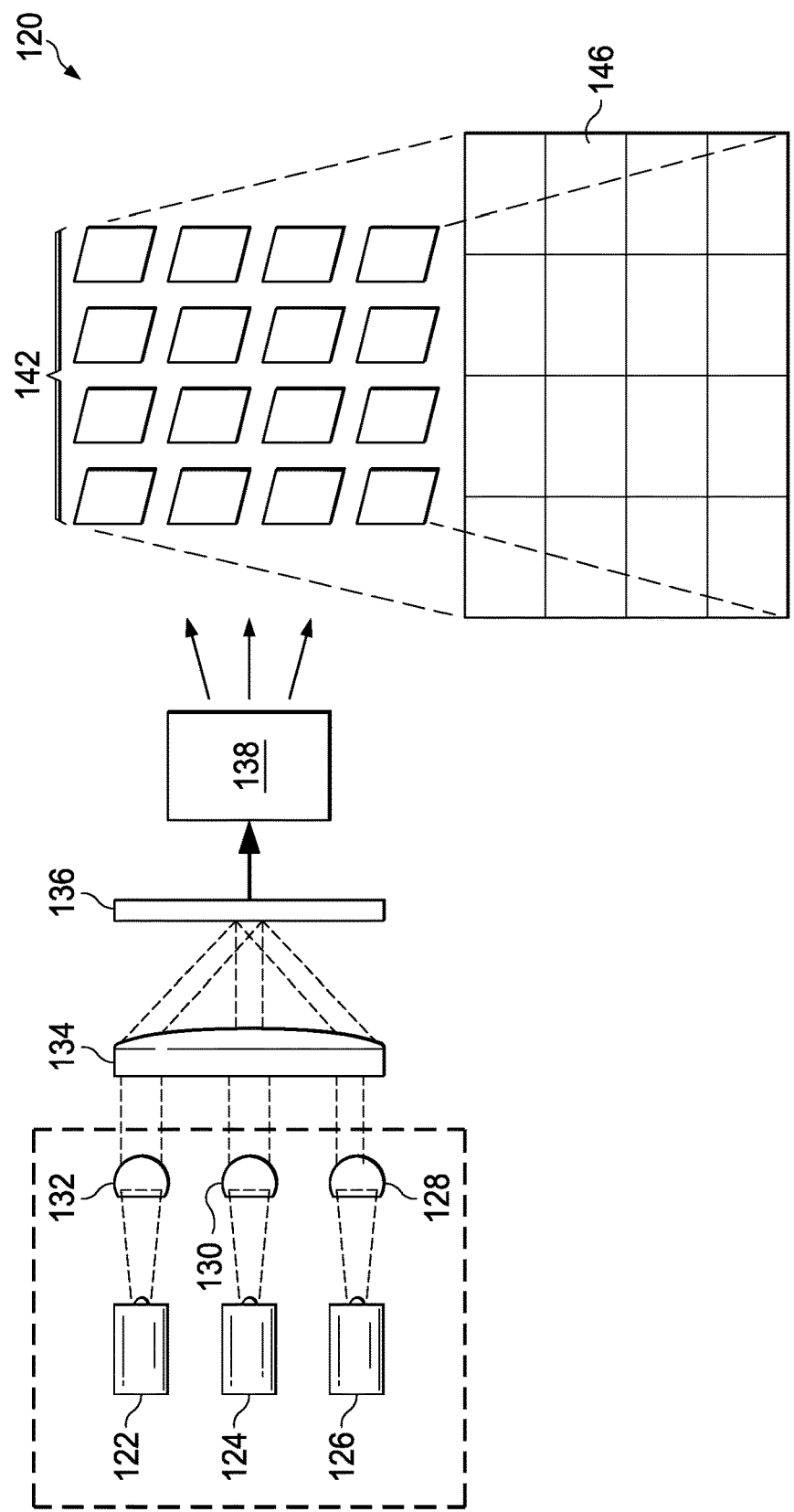

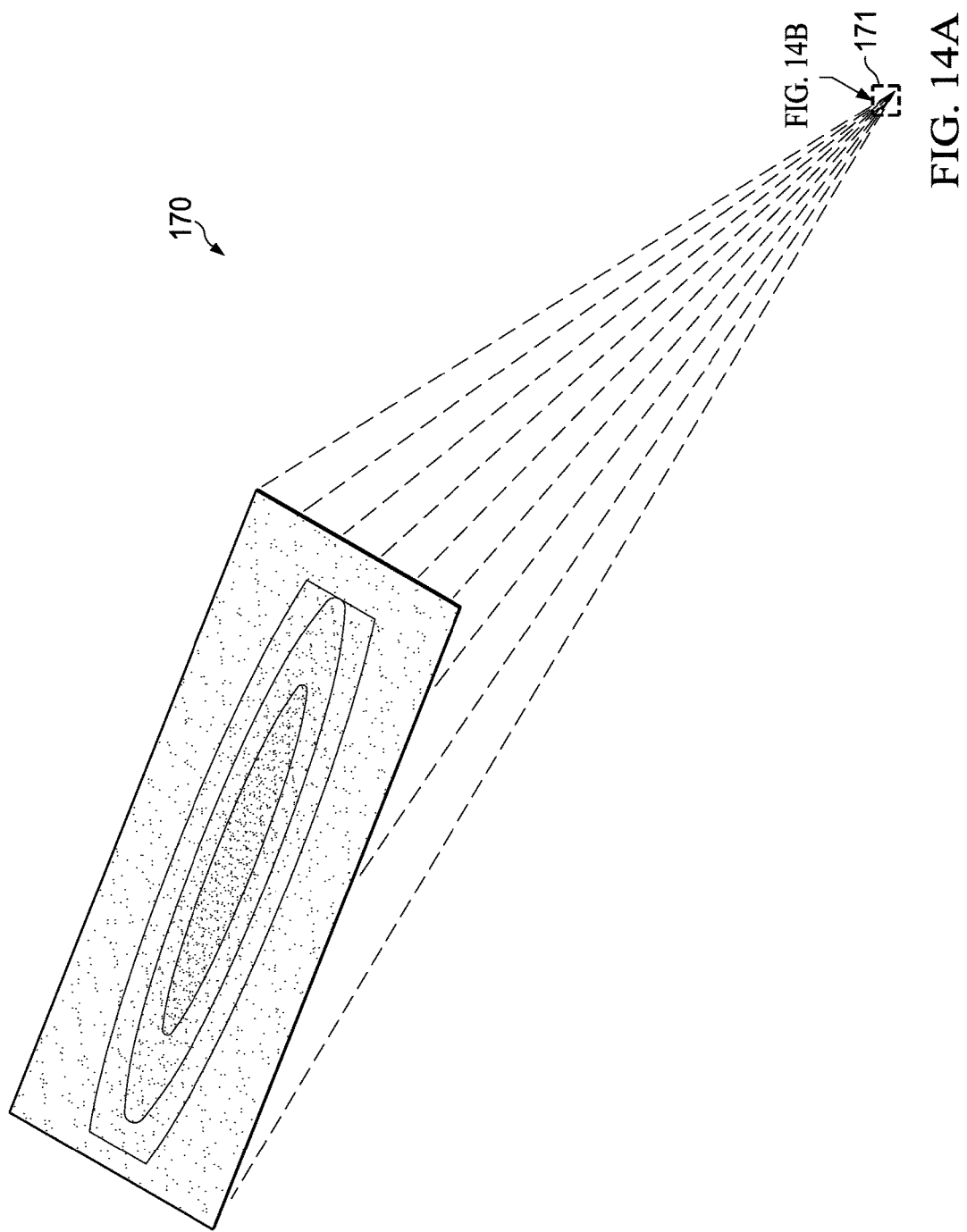

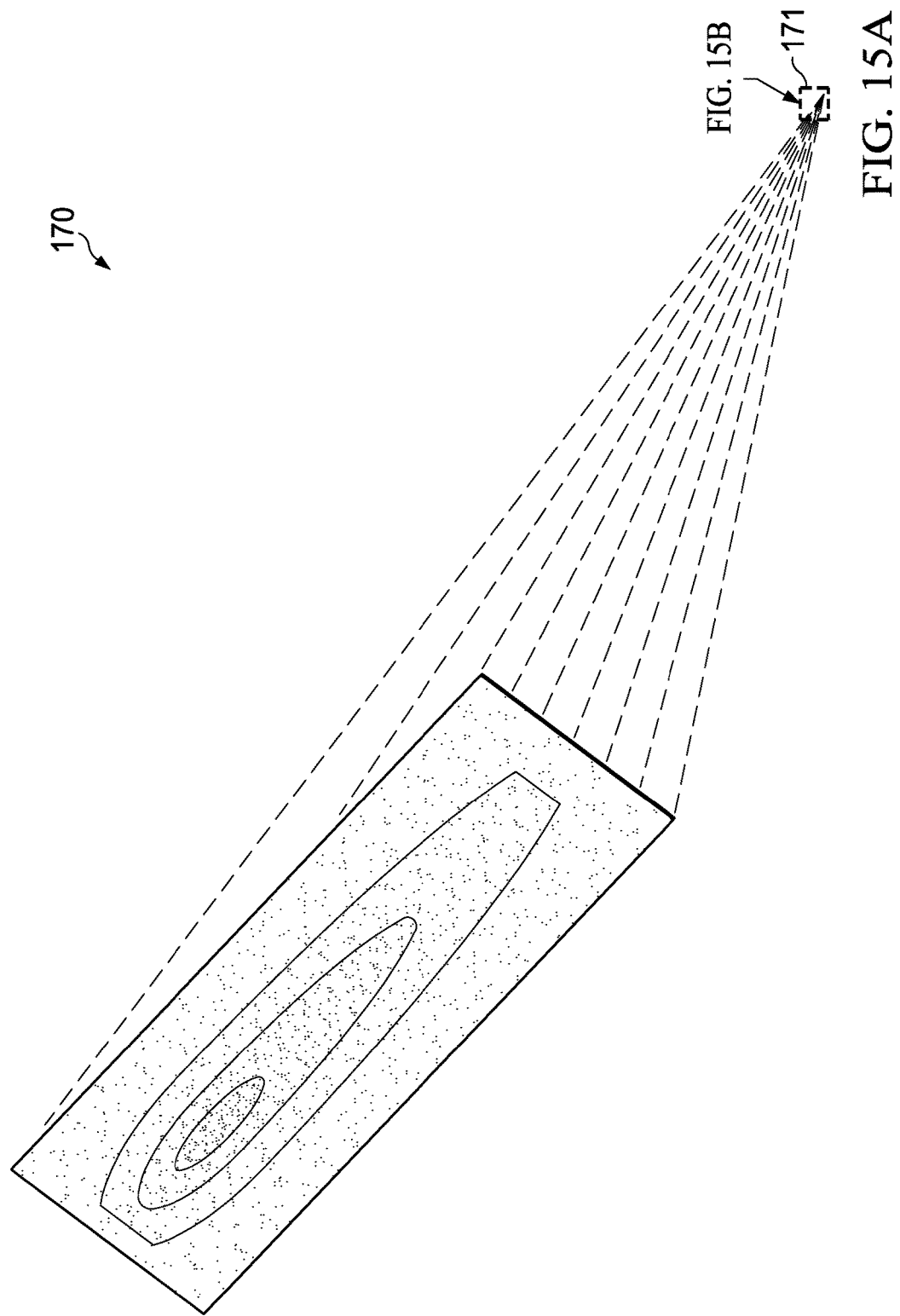

METHODS AND APPARATUS FOR ILLUMINATION WITH DMD AND LASER MODULATED ADAPTIVE BEAM SHAPING

RELATED APPLICATIONS

This patent application claims priority to U.S. Provisional Patent Application Ser. No. 62/017,483, entitled "HEAD LAMP WITH DMD AND LASER MODULATED BEAM SHAPING," filed on Jun. 26, 2014, which is hereby incorporated by reference herein in its entirety.

TECHNICAL FIELD

Aspects of the present application relate generally to the use of MEMS reflective devices such as digital micro-mirror devices (DMDs) used to project light for illumination. Applications of DMD projection include automotive head lamps, projection displays, spotlights, flashlights, aircraft lamps, marine lamps and other illumination and light beam applications such as event lighting, stage lighting and the like. In a non-limiting example application, an automotive head lamp is provided including a DMD device that is illuminated by white light created using a laser excited phosphor and which projects a beam of light through a lens or other optics. The arrangements of the present application advantageously provide a light or lamp using a laser-phosphor illuminated DMD device as a projection source, with adaptive beam shaping, greater brightness, and having greater efficiency than was previously possible.

BACKGROUND

In certain applications, beam shaping and adaptive beam control are needed and/or desired in the projected light of an illumination system. In an example automotive application, the beam from an automotive head lamp should, if possible, bend to adapt the path ahead with the forward motion of the automobile. In this manner the illumination beam will illuminate the path around curves so that the light beam illuminates the path the automobile is going to traverse. This is not possible with a fixed position head lamp. Further, the automobile head lamp should direct light away from oncoming traffic (or be "glare-free") while maintaining bright illumination for the driver. Conventional systems require the driver to turn OFF the high beam and rely only on lowered illumination (that is use "low beam") when on-coming traffic approaches, or risk blinding the on-coming drivers due to glare in the eyes of the on-coming drivers.

FIG. 1 illustrates in a block diagram an example prior known automotive head lamp system with beam steering. In FIG. 1, in a head lamp system 10 a conventional illumination source 14 such as a sealed beam lamp is mounted on a swivel that is driven by a motor 16. A control 18 receives inputs from the steering system, a vehicle speed sensor, and a vehicle height sensor, and the lamp 14 is pointed mechanically as the vehicle turns and moves. This prior known approach requires motors and moving parts in the automotive head lamps, making maintenance and repair more frequent and replacement very expensive. Further the prior known approach illustrated in FIG. 1 often still requires the driver to operate the lamp in a "high beam" and "low beam" mode to adapt the beam to a "low beam" position when on-coming traffic approaches.

Another known approach to providing head lamps is to use DMD devices. Lighting with DMD projection offers the opportunity to provide bright and adaptive lighting solutions for many applications. Because the DMD array is "pixel addressable," the projected beam of light formed with a DMD device can be adaptively shaped to suit a variety of needs. For example, control circuitry can be used to adaptively shape the beam of light projected so as to avoid the eyes of oncoming drivers. Sensors and control circuitry can be used to automate this "glare free" function.

FIG. 2 illustrates in a block diagram a conventional DMD illumination system using a DMD device. The system 20 of FIG. 2 is presented to further illustrate the problems of prior known approaches. In system 20, a single light source 21 and illumination optics 23 are used to direct light from the light source 21 onto the face of the mirrors 24 within a DMD device 22. The DMD device 22 is formed by micro-electromechanical system (MEMS) technology which is based in part on semiconductor device processing. A semiconductor substrate 26 is processed using semiconductor processing steps such as photolithography and other steps including deposition, patterning, etching and metallization steps. An array of micro-mirrors 24 is formed over the substrate 26. In an example process the micro-mirrors 24 are formed of aluminum and are mounted on a hinged mechanism. The micro-mirrors 24 are attached on a hinge and can be tilted using electronic signals applied to electrodes that control a tilt by pivoting the micro-mirrors about an axis. In an example DMD device, thousands and even millions of the micro-mirrors are formed in an array that forms a VGA, 720p or 1080p or even higher resolution imaging device, for example. When used in a lamp application, individual micro-mirrors 24 are positioned to reflect the light from the illumination optics 23 to a projection lens 28 and as shown in FIG. 2, a beam of light is projected out of the system 20.

The micro-mirrors 24 in FIG. 2 have three individual states, a first "on" state; second a flat or parked state, and finally an "off" state. In the "on" state, the micro-mirrors 24 in FIG. 2 are tilted in a first tilted position from the flat position, due to signals on an electrode that cause the hinge to flex, and in system 20 the micro-mirrors 24 are positioned to reflect incoming light from illumination optics 23 outwards to the projection lens 28. In the "off" state, the micro-mirrors 24 are tilted in a different tilted position to reflect the light away from the projection lens 28. A thermal "light dump" (not shown in FIG. 2) can be provided to collect the light not projected by the lens 28. By varying the tilted positions using electrical control signals, the micro-mirrors 24 can be used to direct light to the projection lens 28 or the reflected light can be reflected away from the projection lens 28. In addition to the "on" and "off" tilted positions, the micro-mirrors can be placed in a "flat" state. The flat state is a safe position the mirrors take when no power is applied to the DMD device.

FIG. 3 illustrates in a block diagram the operation of a micro-mirror in a DMD projection system. In FIG. 3, in a projection system 30 a single illustrative micro-mirror 38 illustrates the various positions used for the micro-mirrors. In the "on" state, the micro-mirror 38 is at a first tilted position, for example at +12 degrees from the vertical or flat position. The illumination source 36 is angled at −24 degrees from the zero degree position, which is aligned with the projection lens 34. Because in reflection from a mirror, the angle of incidence (AOI) of the incoming light is equal to the angle of reflection (AOR) of the reflected light, for a +12 degree tilt, the −24 degree angle for the illumination source results in reflected light at the zero degree position as shown in FIG. 3. The cone of reflected light labeled "on state energy" shows the reflected light directed outwards from the micro-mirror 38 at the zero degree position. Other DMD devices may provide different tilt angles, such as +/−10 degrees, or +/−17 degrees. When the micro-mirror 38 is in the "on" state, the light from the illumination source 36 is reflected as the cone of light labeled "on state energy" at zero degrees into the projection lens 34. The projected light is then output from the system 30. The micro-mirrors can also be put in a "flat" state position, when the system is not powered, and the micro-mirrors can also be put in an "off" state. In the "off" state position, the micro-mirror 14 is at a second tilted position at an angle of −12 degrees from the flat position, and in the "off" state the light that strikes the micro-mirror is reflected away from the projection lens 34, and is not output from the system 30 but instead is output into a light dump 32. In conventional projection systems the flat position of the micro-mirror 38 is not used when power to the system is applied, but is instead used when the system is not powered. The flat position is sometimes referred to as a "parked" or "safe" position for the micro-mirror 38.

In forming an adaptive beam, certain of the mirrors in a DMD array can be tilted to the "off" position while other mirrors are tilted to the "on" position and reflect light to the projection lens. In this manner it is possible to shape the beam of light projected by the lens in FIG. 3. However, the mirrors in the "off" position direct light away from the lens, which is inherently inefficient, in that the light provided by the illumination source is only partially utilized. The unused light is directed to a "light dump" which collects it as thermal energy that then must be dissipated. Using a conventional illumination source with a DMD, even when the DMD is operated to adaptively shape the projected beam of light, is therefore inherently inefficient.

Improvements in adaptive beam illumination using light projection incorporating DMD devices are therefore needed to address the deficiencies and the disadvantages of the known prior approaches. Solutions are needed that are energy efficient, robust, that provide reliable device operation with high brightness, long device life, and that are easy to implement and use.

SUMMARY

Aspects of the present application provide solutions to the use of DMD illumination for lamps such as automotive head lamps that overcome the deficiencies and the disadvantages of the prior known solutions. In an aspect of the present application, a DMD illumination system is provided that includes a plurality of laser illumination sources arranged proximate to a digital micro-mirror device, each of the plurality of illumination sources directing light onto a phosphor arranged between the plurality of laser illumination sources and the digital micro-mirror device; control circuitry coupled to the plurality of illumination sources and to the digital micro-mirror device configured for controlling the position of the array of micro-mirrors by applying one or more control signals to the digital micro-mirror device, and further configured for providing control signals to each of the plurality of laser illumination sources, so that the light from the plurality of laser illumination sources strikes the phosphor and is then directed from the phosphor onto the array of micro-mirrors in the digital micro-mirror device when the micro-mirrors are at a predetermined position, and the light is reflected from the digital micro-mirror device and out of the system.

In another aspect of the present application, a method for projecting light for illumination from a DMD device includes providing a plurality of laser illumination sources proximate to a digital micro-mirror device; providing a phosphor positioned between the laser illumination sources and the digital micro-mirror device and configured to receive light from the laser illumination sources; directing light from the plurality of laser illumination sources onto the phosphor to form an adaptive pattern and directing the resulting light onto an array of micro-mirrors in the digital micro-mirror device having at least two tilt positions, the light from the phosphor and the plurality of laser illumination sources being reflected from the array of micro-mirrors towards a light projection system; collecting the reflected light into the light projection system configured for projecting the collected light; and controlling the position of the micro-mirrors in the array of micro-mirrors to put each of the micro-mirrors in one of the two tilt positions, and controlling the plurality of laser illumination sources so that for the particular one of the tilt positions, light from the plurality of laser illumination sources is directed onto the phosphor to form a pattern of light that is further projected on to the array of micro-mirrors and then reflected into the light projection system.

In still another arrangement that forms an additional aspect of the present application, a laser illumination source DMD head lamp includes a digital micro-mirror device having an array of micro-mirrors that are configured to move between a first tilted position and a second tilted position, responsive to control signals; a plurality of laser illumination sources positioned proximal to the digital micro mirror device and each of the plurality of laser illumination sources configured to direct light onto a phosphor responsive to control signals; illumination optics positioned between the phosphor and the array of micro-mirrors and to direct light from the phosphor onto the array of micro-mirrors; a light projection optics configured to collect light reflected from the array of micro-mirrors and having a lens to project the light out of the DMD head lamp; and a controller configured to send control signals to the digital micro-mirror device to place the array of micro-mirrors in the first tilted position and the second tilted position while simultaneously controlling the light distribution output from each of the plurality of laser illumination sources, so that light output from the laser illumination sources impact the phosphor and the resulting light pattern is reflected from the array of micro-mirrors into the light projection optics and out of the lens.

Previously, use of a DMD device in a projected light illumination system such as for an automotive head lamp was sometimes considered impossible or inappropriate, because the overall brightness that could be achieved reliably using a DMD was less than needed or desired. Recognition is made in the arrangements of the present application that the use of both varying light distribution levels in multiple laser illumination sources in conjunction with use of adaptive beam shaping in the DMD device can efficiently provide an adaptively shaped beam from an illumination system and having high brightness.

BRIEF DESCRIPTION OF THE DRAWINGS

For a more complete understanding of the illustrative arrangements that form aspects of the application described herein and the advantages thereof, reference is now made to the following descriptions taken in conjunction with the accompanying drawings, in which:

FIG. 11 illustrates in a block diagram an example arrangement of a DMD illumination system incorporating various arrangements that form aspects of the present application;

FIGS. 14A-C further illustrate in a system diagram and corresponding expanded views the operation of an arrangement headlight module that forms an aspect of the present application in projecting a first pattern of illumination; and FIGS. 15A-C illustrate in a system diagram and corresponding expanded views the operation of the arrangement headlight module of FIGS. 14A-C used in projecting another pattern of illumination.

Corresponding numerals and symbols in the different figures generally refer to corresponding parts unless otherwise indicated. The figures are drawn to clearly illustrate the relevant aspects of the various arrangements and are not necessarily drawn to scale.

DETAILED DESCRIPTION

The making and using of various example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled."

In the various arrangements, novel arrangements are provided for a DMD lighting apparatus with excellent brightness at the output that is robust, reliable and simple to implement. In the various arrangements, a multiple laser source illumination system is used. Two or even more laser illumination sources can be used in various alternative arrangements.

Figure 1:
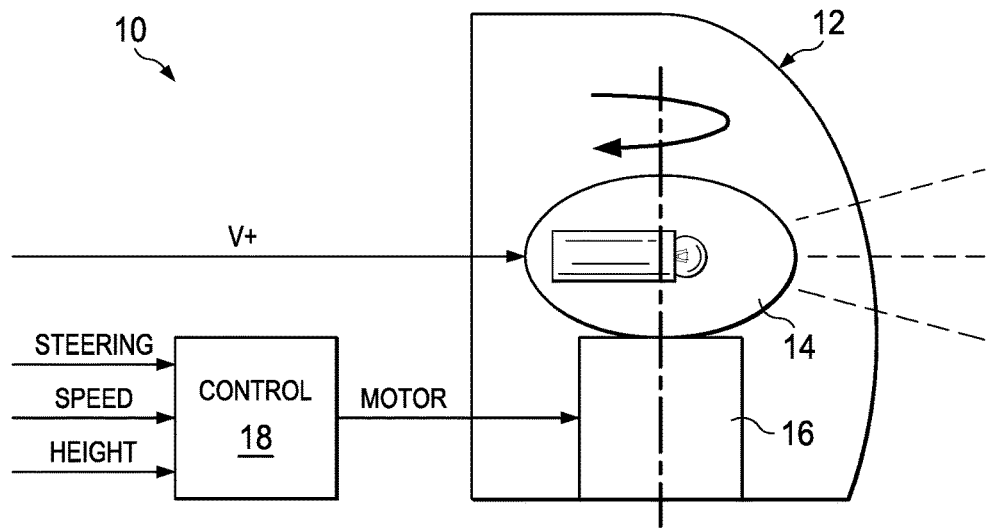
FIG. 1 illustrates in a block diagram an example prior known automotive head lamp system with beam steering.
Figure 2:
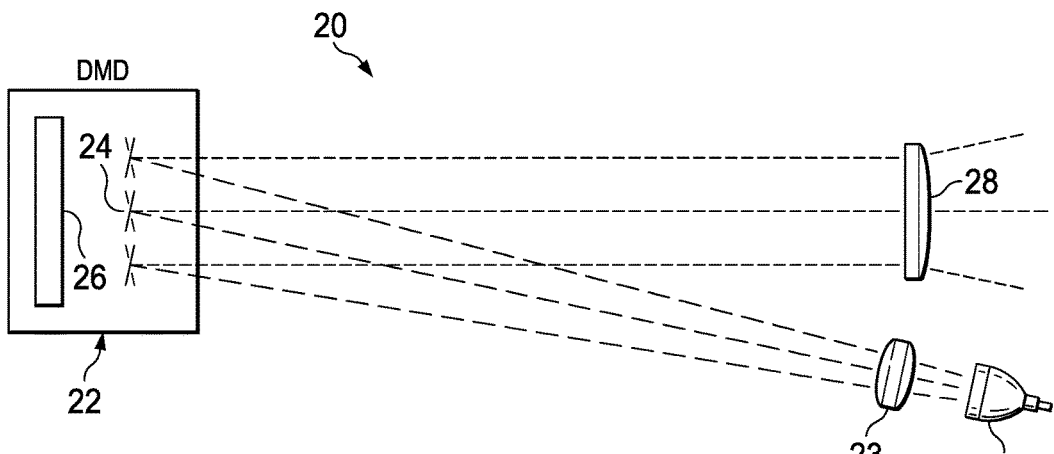
FIG. 2 illustrates in a block diagram a conventional DMD illumination system.
Figure 3:
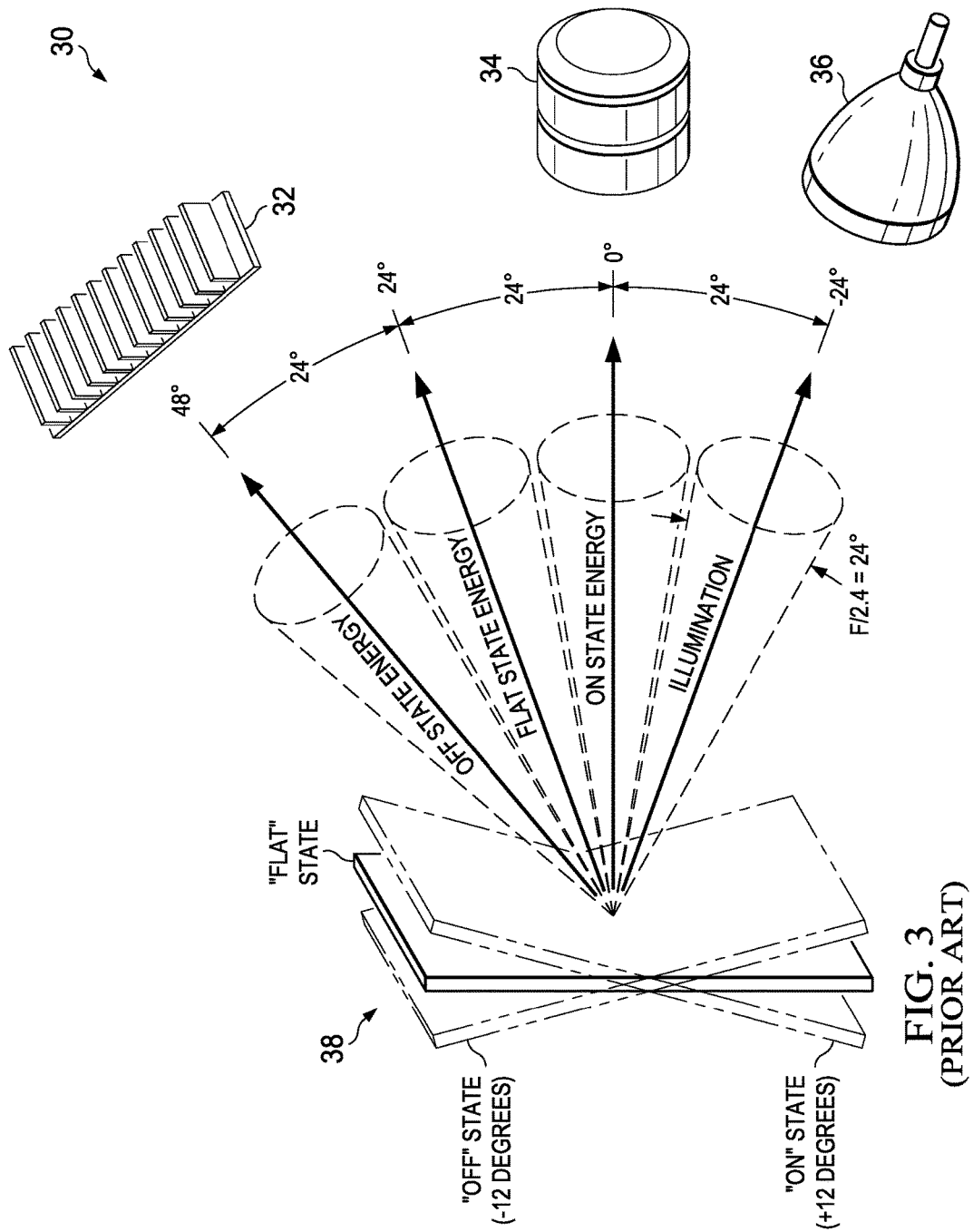
FIG. 3 illustrates in a block diagram the operation of a micro-mirror in a DMD projection system.
Figure 4:
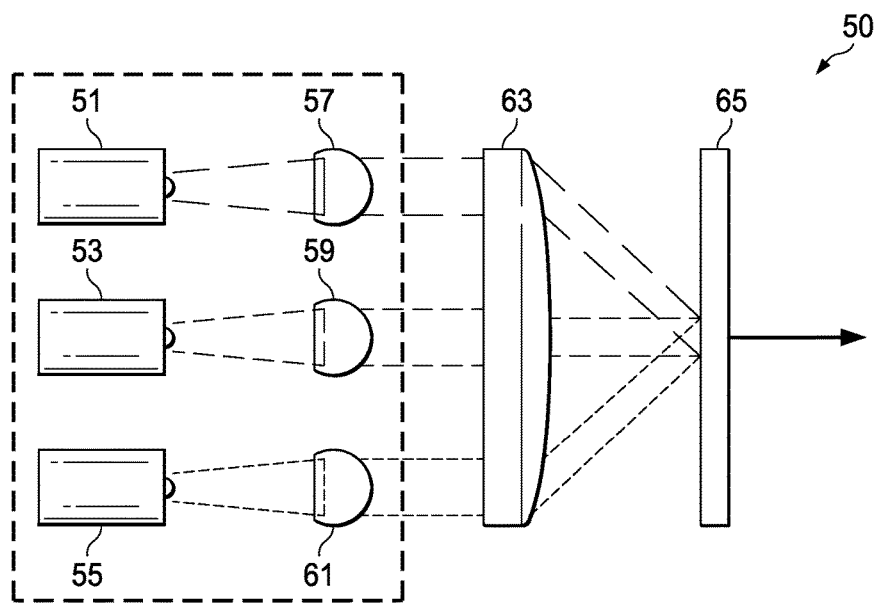
FIG. 4 illustrates in a simplified block diagram an arrangement of the present application including multiple laser illumination sources.

FIG. 4 depicts in a simple block diagram an illumination system 50 having, for example, multiple laser illumination sources 51, 53, and 55. In this particular example, three groups of laser illumination sources are used, however the arrangements of the present application are not so limited. In a non-limiting example, the groups of laser illumination sources 51, 53, and 55 can output light that is visibly blue, e.g., that has a wavelength between 450-495 nm. Alternative arrangements can include using violet laser sources, e.g. laser sources having an output light with a wavelength from 380-450 nm. In system 50, a phosphor device 65 is formed of a material that emits photons in response to being illuminated, that is phosphor 65 exhibits luminescence. The phosphor 65 can be transmissive material or reflective material. The phosphor 65 acts as a down converter by outputting white light that is different from the light that excites the phosphor. Example materials than can be used for phosphor 65 include "YAG" compositions including yttrium, aluminum and garnet in a compound. In one non-limiting example the phosphor material 65 has a chemical composition of $Y_3Al_5O_{12}$ and may be formed from application of powders, and the phosphor material can be provided as a powder for coating a base material. The YAG phosphor will emit yellow photons when illuminated. When the phosphor 65 is impacted by photons, light will be emitted with a wavelength between 510-610 nm, and when illuminated with a blue laser, the resulting light (which includes both the yellow and the blue light) is visibly white. Other materials that are used for phosphors include aluminate, nitride and silicate based coatings. In system 50, three groups of lasers 51, 53, and 55 are provided and the laser output is directed through collimators 57, 59 61 to make the laser light beam less divergent. Each group can include one or several laser sources. Then, using a beam shaper 63, the light from the laser sources 51, 53, and 55 is directed on to the surface of the phosphor 65. The resulting white light is then used to illuminate the mirrors in a DMD device (not shown in FIG. 5).

By varying the light distribution levels of the illumination of the individual laser sources 51, 53, 55 in system 50, an adaptive illumination can be accomplished. The light beams overlap at the phosphor partially and the overlapping beams form a pattern that can be adapted. Use of the arrangements of the present application enables adaptive beam shaping that can be efficiently performed. For example, if a portion of a DMD is going to be tilted in the "off" position so as to shape the projected beam of light, the light distribution level of the laser illumination directed to that portion of the DMD array can also be reduced, so that the light impacting these micro mirrors is lessened and the light that does impact the mirror array is directed to the projection lens, with less light directed to a "light dump." Efficiency is thereby improved and by adding additional control features to the system the adaptive beam shaping can also be better tailored for a particular application. Using the laser sources with varying light distribution levels an initial beam shaping can be performed, and this pattern can be further fine-tuned by adaptively operating the micro-mirrors in the DMD device, which are individually addressable as is further described below.

In one non-limiting arrangement, the three laser sources 51, 53, 55 shown in FIG. 5 can be positioned in an arrangement corresponding to the left, center and right of a beam to control the horizontal light distribution of the resulting beam. This arrangement can be accomplished using the three laser sources as described above, or in an alternative arrangement, using a plurality of laser sources in a group for each laser source that can be arranged in various ways including an array or grid. In another alternative arrangement that forms an additional aspect of the present application, the laser sources can be arranged vertically to control light distribution at the upper, center and lower portion of a beam, for example. Other arrangements using multiple laser sources are contemplated as forming additional aspects of the present application.

Figure 5C:
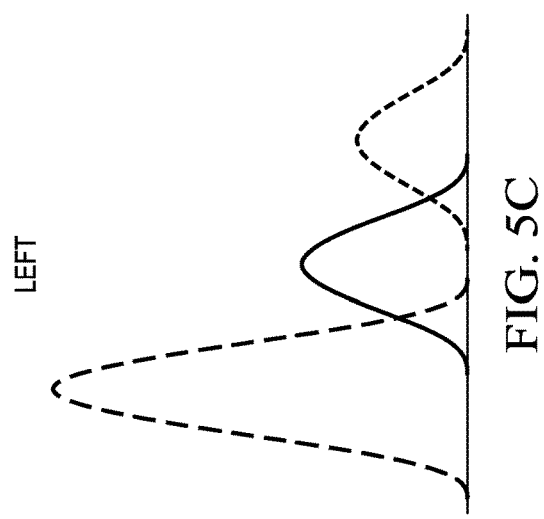
FIGS. 5A-5C illustrate in graphs intensity patterns that can be obtained using the arrangements shown in FIG. 4.
Figure 5B:
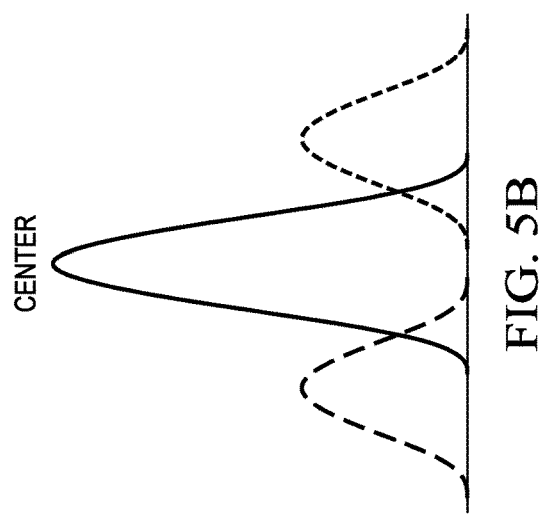
Figure 5A:
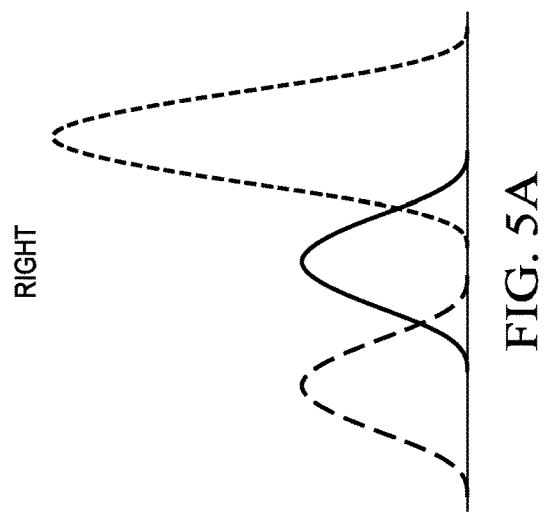

FIGS. 5A-5C illustrate in graphs light distributions that can be obtained using the arrangements shown in FIG. 4. In a FIG. 5A, the graph labeled "RIGHT" illustrates a beam shaping to form a beam that has maximum intensity on the right side, and has a lower intensity at the center and left sides. As shown in FIG. 5A, the optical output of the laser source that is at the right side of the light path is high, while the optical output of the left and center position laser sources is reduced. The pattern generated at the phosphor in FIG. 4 will reflect the laser output levels and this pattern will then be directed onto the DMD device to further shape the beam that is eventually projected by the system.

In FIG. 5B, the graph labeled "CENTER" illustrates the use of varying optic power levels to create a pattern of light at the phosphor that has a large intensity in a center portion and smaller intensities to the right and left. In this example, the laser sources that correspond to the center of the light beam radiate at higher optical power than the laser sources that correspond to the right and left sides of the light beam that strikes the phosphor in FIG. 4.

In FIG. 5C, the graph labeled "LEFT" illustrates the use of varying the optical power of the laser sources to create a pattern of light at the phosphor in FIG. 4 that has a large intensity at the left side, with reduced intensity at the center and right portions. Again the intensity of the pattern is created by varying the illumination from the laser sources in FIG. 4.

The light distribution variation can be accomplished in one example arrangement by varying current that is used to drive the groups of laser sources. 51, 53, 55 in FIG. 4. As the current to a particular laser source increases, the output power from that laser source will correspondingly increase. A decrease in output power can also be accomplished by decreasing the current to the laser source. In another approach that forms an alternate arrangement of the present application, the laser source output power can also be controlled using a pulse width modulation approach. In this approach, the duty cycle of a power supply to the individual laser sources can be varied. For increased optical power, the amount of time a particular laser source is on can be increased by increasing the pulse width of a clocking signal used to supply the power to the laser source or to control the laser source. Similarly, reducing the pulse width of the clocking signal can reduce the power that is output by a laser source. In arrangements that form additional aspects of the present application, the pattern at the phosphor is then used in combination with adaptive control of the addressable pixel elements in the DMD to further shape the resulting beam.

Figure 6:
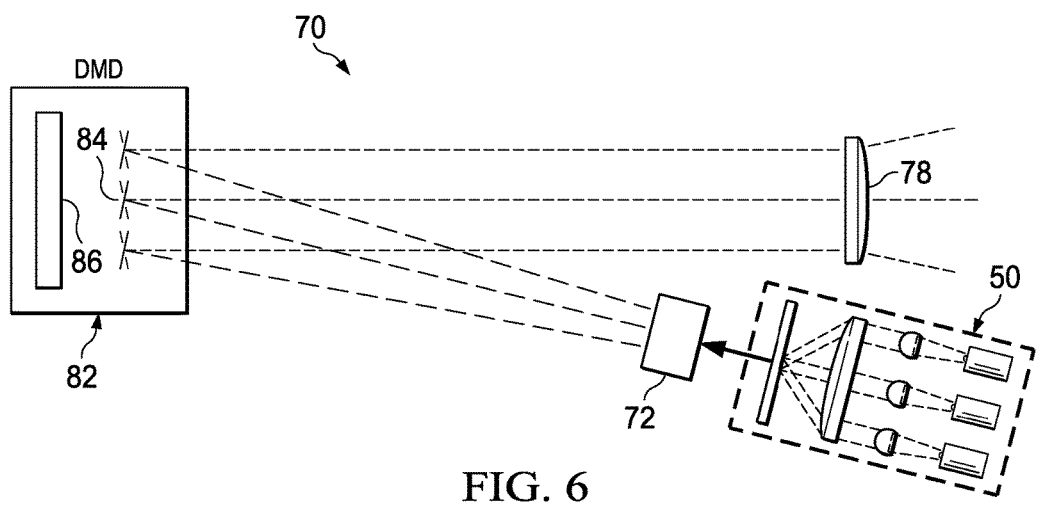
FIG. 6 illustrates in a simplified block diagram an arrangement DMD illumination system that incorporates aspects of the present application.

FIG. 6 illustrates in a simplified block diagram an arrangement DMD illumination system that incorporates aspects of the present application. In FIG. 6, in a system 70, a digital micro-mirror device DMD 82 includes a substrate 86 and an array of micro-mirrors 84. There may be thousands or millions of micro-mirrors in a rectangular or square micro-mirror array in DMD 82, further the micro-mirrors are individually addressable, and each micro-mirror can tilt to a first position and a second position, responsive to control signals. Each micro-mirror 84 also has a third untilted, or flat, position. A projection optics element 78 such as a lens is used to collect and output the reflected light from the system 70. In an example arrangement for a particular application, the lens 78 may be part of an automotive head lamp assembly. In the illustrative system 70, a laser illumination system such as, for example, system 50 from FIG. 4 is used to illuminate the micro-mirrors in DMD 82. As described above, multiple laser illumination sources are arranged and controlled to form patterns of intensity on a phosphor to form a beam. Optics 72 are imaging optics that are used to relay the light distribution formed at the phosphor device onto the micro-mirrors 84. The optics used can be formed in a variety of ways so long as the light distribution pattern developed at the phosphor is preserved and presented to the digital micro-mirror devices. In another aspect of the present application that provides additional capabilities, additional beam shaping can be performed by selectively tilting the addressable micro-mirrors in the DMD to turn individual pixels "on" and "off." A dynamic beam shaping can thus be performed by using the optical power controls of the laser illumination sources in the illumination system 50 in conjunction with the positions of the addressable DMD elements in DMD 82.

Figure 7:
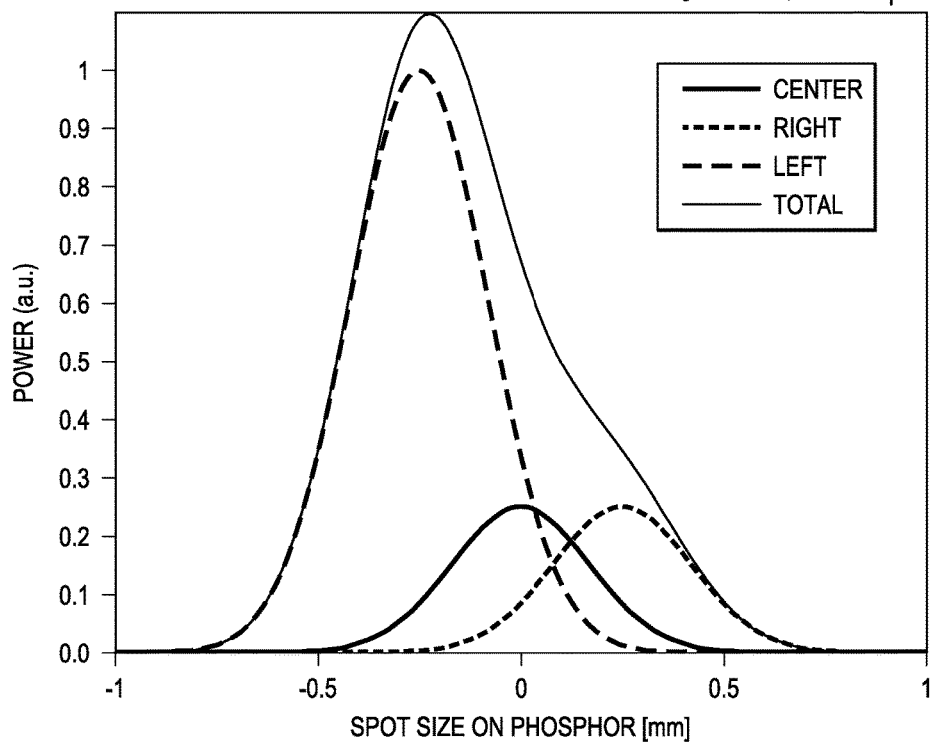
FIG. 7 illustrates in a graph the intensity obtained using arrangements of the present application to form a predetermined spot pattern.

FIG. 7 depicts in a plot the power (on the vertical axis) and the laser spot size (on the horizontal axis) for an example light distribution to produce a beam that is brighter on the left side. In the graph of FIG. 7, the three groups of laser sources left, center and right such as shown in FIG. 4, are shown with varying optical power to form a desired pattern at the phosphor. The uppermost line plots the combined total power for the three laser sources. As can be seen from the graph, the peak of the power is to the left of the center (at position 0 on the horizontal axis) and extends to the center and right with falling power from the peak left of the center. The second line from the top corresponds to the spot formed by the left laser source, and is fully powered at a normalized level of "1." The center and right laser sources are powered at 0.25 levels, and the total power curve falls away from the left side to the center and on to the right side.

Figure 8:
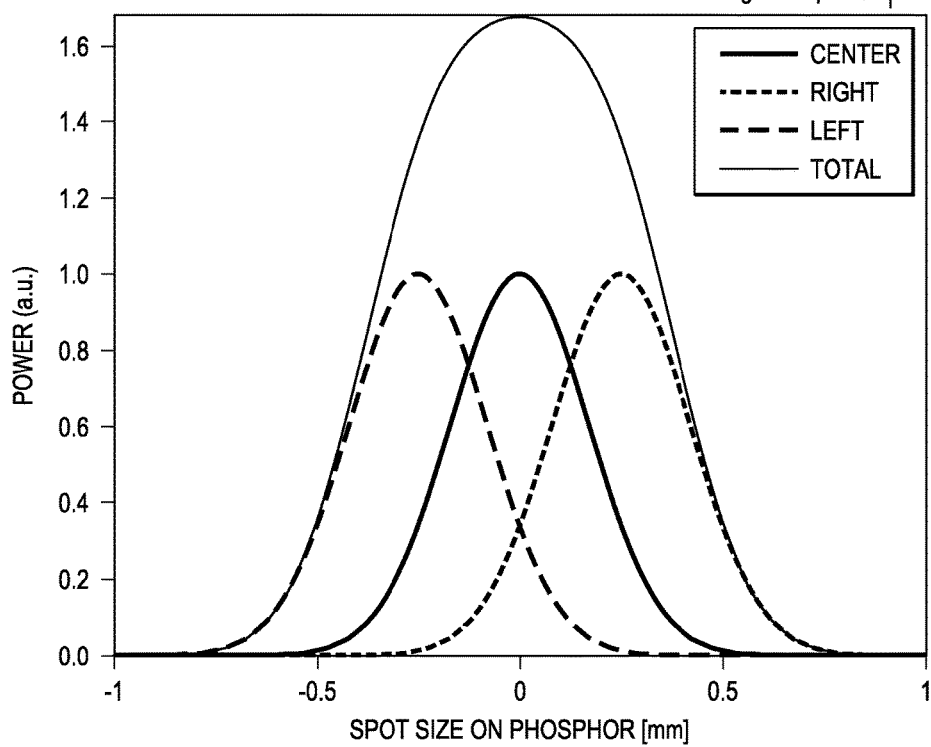
FIG. 8 illustrates in another graph the intensity obtained using arrangements of the present application to form an additional predetermined spot pattern.

FIG. 8 depicts in a plot the power (plotted on the vertical axis) and laser spot size on the phosphor (the spot size is shown plotted on the horizontal axis) for another example light distribution pattern. In this example, the pattern is formed with the beam at maximum power in the center. This is accomplished by providing equal power for each of the three laser sources, the left, center and right laser source such as those in FIG. 4. The upper most curve in FIG. 8 illustrates the total power achieved, which is the sum of the power from the left, center and right laser sources, each at a maximum power level normalized to "1" in the plot. The maximum power in this example is in the center of the phosphor area (at 0 on the horizontal axis) and falls away in both the left and right directions slowly from the center.

Figure 9A:
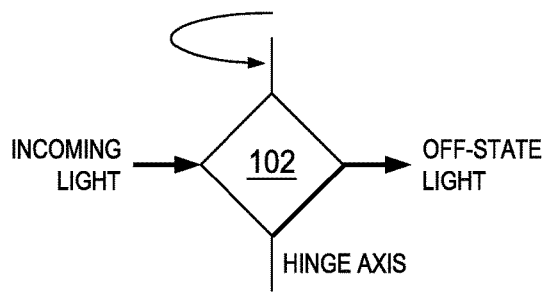
FIG. 9A illustrates the operation of a VSP micro-mirror for use with the various arrangements of the present application.
Figure 9B:
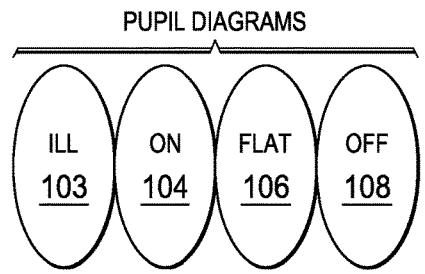
FIG. 9B illustrates in a pupil diagram the operation of the VSP micro-mirror of FIG. 9A.

FIGS. 9A and 9B depict the operation of a first type of an example digital micro-mirror device 102 that can be used with the arrangements of the present application. In FIGS. 9A and 9B, operation of a very small pixel (VSP) digital micro-mirror device that is available from Texas Instruments Incorporated is illustrated. VSP micro-mirrors pivot on a single axis and can be arranged in either diamond or Manhattan orientations. In FIG. 9A a diamond oriented micro-mirror 102 is shown receiving illumination from one side. The micro-mirror 102 can be tilted from −12 degrees to +12 degrees, for example. In additional arrangements, other tilt arrangements such as +/−10 degrees can be used. In FIG. 9B, a pupil diagram corresponding to the illumination, on, flat and off states of the micro-mirror of FIG. 9A is shown. In FIG. 9B, the pupil diagram illustrates the direction light is reflected from the micro-mirror in the on, flat and off positions. In addition a pupil 103 indicates the position of the illumination sources. Position 104 illustrates the reflected light when the micro-mirror is tilted in the "on" position. In this position the light is directed to a projection lens and out of the system. In position 106 the "flat" position is shown. In this position the micro-mirror is flat and not powered. In position 108 the "off" position is shown. In this position the light incident on the micro-mirror 102 is directed to away from the projection system. In this instance the light is not used to form the projected light beam output by the projection system. A light dump or heat sink can be used to collect the energy from the light directed away from the projection system.

Figure 10A:
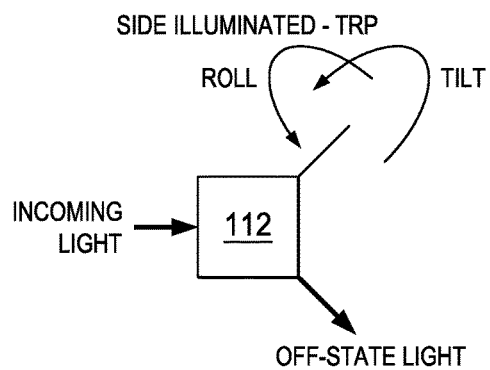
FIG. 10A illustrates the operation of a TRP micro-mirror for use with the various arrangements of the present application with side illumination.
Figure 10B:
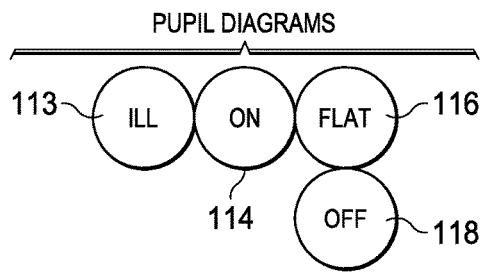
FIG. 10B illustrates in a pupil diagram the operation of the TRP micro-mirror of F 10A.

FIGS. 10A and 10B depict the operation of a second type of digital micro-mirror device 102 that can be used with the arrangements of the present application. In FIGS. 10A and 10B, the operation of a tilt and roll pixel ("TRP") micro-mirror device is shown with side illumination. TRP micro-mirror devices are available from Texas Instruments Incorporated and provide high resolution in a smaller area, and using lower power, than VSP micro-mirror devices. In FIG. 10A the TRP micro-mirror device 112 is illustrated. In FIG. 10B, the pupil diagram for three positions of the TRP micro-mirror 112 is shown. In addition the position of the illumination sources is shown as 113. In operation, the TRP micro-mirror 112 can tilt to an "on" position or roll to an "off" position in response to control signals. The TRP micro-mirrors have a complex motion along a diagonal axis that tilts in one direction and rolls in another direction. Accordingly, as shown in the pupil diagram, when the TRP micro-mirror 112 is in the "on" position, the incident light is directed to the left, when in the flat position, the incident light is directed to the center and when in the "off" position, the incident light is directed downwards. In a projection system, when the TRP micro-mirror 112 is in the "on" position the incident light will be directed to a projection system to form the beam output by the illumination system. When the TRP micro-mirror 112 is in the "flat" position, the micro-mirror is not powered. When the TRP micro-mirror 112 is in the "off" position, the incident light is directed away from the projection system and is not part of the beam projected by the illumination system. In this position the incident light can be reflected to a "light dump" or thermal sink.

Figure 10C:
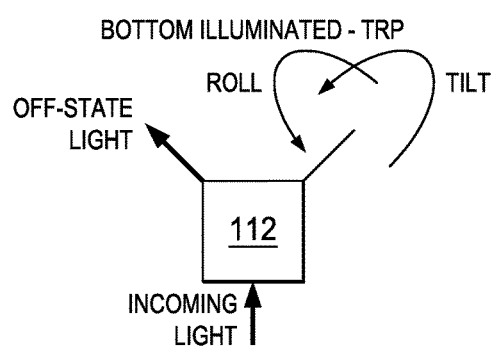
FIG. 10C illustrates the operation of a TRP micro-mirror for use with the various arrangements of the present application with bottom illumination.
Figure 10D:
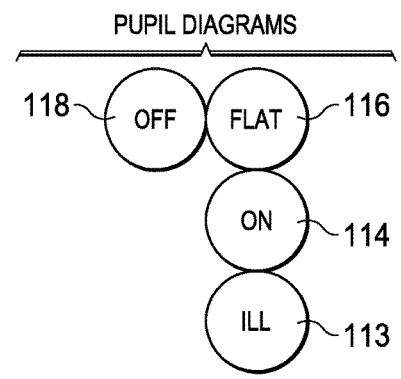
FIG. 10D illustrates in a pupil diagram the operation of the TRP micro-mirror of FIG. 10C.

FIGS. 10C and 10D illustrate the operation of the same micro-mirror device, a TRP micro-mirror device, with a bottom illumination arrangement. In FIG. 10C, the illumination is directed to the DMD 112 from the bottom. In FIG. 10D, a pupil diagram illustrates the position of the illumination source 113. The three tilt positions 114, 116, 118 illustrate the reflected light from the DMD 112 when the mirrors are in the ON, 114, FLAT, 116, and OFF, 118, positions using bottom side illumination. In the ON pupil position the light from the illumination source, which is positioned beneath the TRP device, is reflected from the DMD to a projection lens system. In the OFF pupil position, the DMD mirrors are tilted to reflect the light from the bottom illumination sources away from a projection lens system, and into a light dump or heat sink. The FLAT position indicates in the pupil diagram when the DMD mirrors are not tilted.

FIG. 11 illustrates in a block diagram a DMD illumination system incorporating various arrangements that form aspects of the present application. FIG. 11 depicts portions of an illumination system. Illumination system 120 can be used to form an automotive head lamp, as a non-limiting example. Other applications can be addressed by use of the illumination system 120, including without limitation, illumination lamps for marine, home, aviation, commercial buildings and outdoor spaces, spotlights, theatrical and stage lighting, handheld, wearable and portable lamps. In FIG. 11, a plurality of groups of laser sources 122, 124 and 126 are positioned to direct laser outputs onto a phosphor 136. In an example arrangement the laser sources output visibly blue light, and the phosphor 136 emits visibly yellow light in response to the incident blue light, the resulting light is therefore visibly white. The phosphor 136 can be reflective or transmissive material. The light distribution pattern at the phosphor 136 is determined by the overlapping outputs of the outputs of the laser sources 122, 124, 126 and as described above, by adjusting the individual optical power levels of the laser sources, can be adaptively adjusted to form different intensity patterns at the phosphor 136. An optical imaging lens or system 138 then transfers the pattern output at the phosphor 136 to the micro-mirrors of a digital micro-mirror device 142. The incident light strikes the surfaces of the micro-mirrors and is reflected to form a beam 146 that is input to a projection system (not shown in FIG. 11) and output from the projection system as described above.

In the example illustrated in FIG. 11, all of the mirrors in the DMD 142 are positioned in the "on" position and thus all of the incident light received by the DMD is output to the projection system. This arrangement can correspond, for example, to a centered beam example where the light beam is output with the highest intensity at the center of a head lamp.

Figure 12:
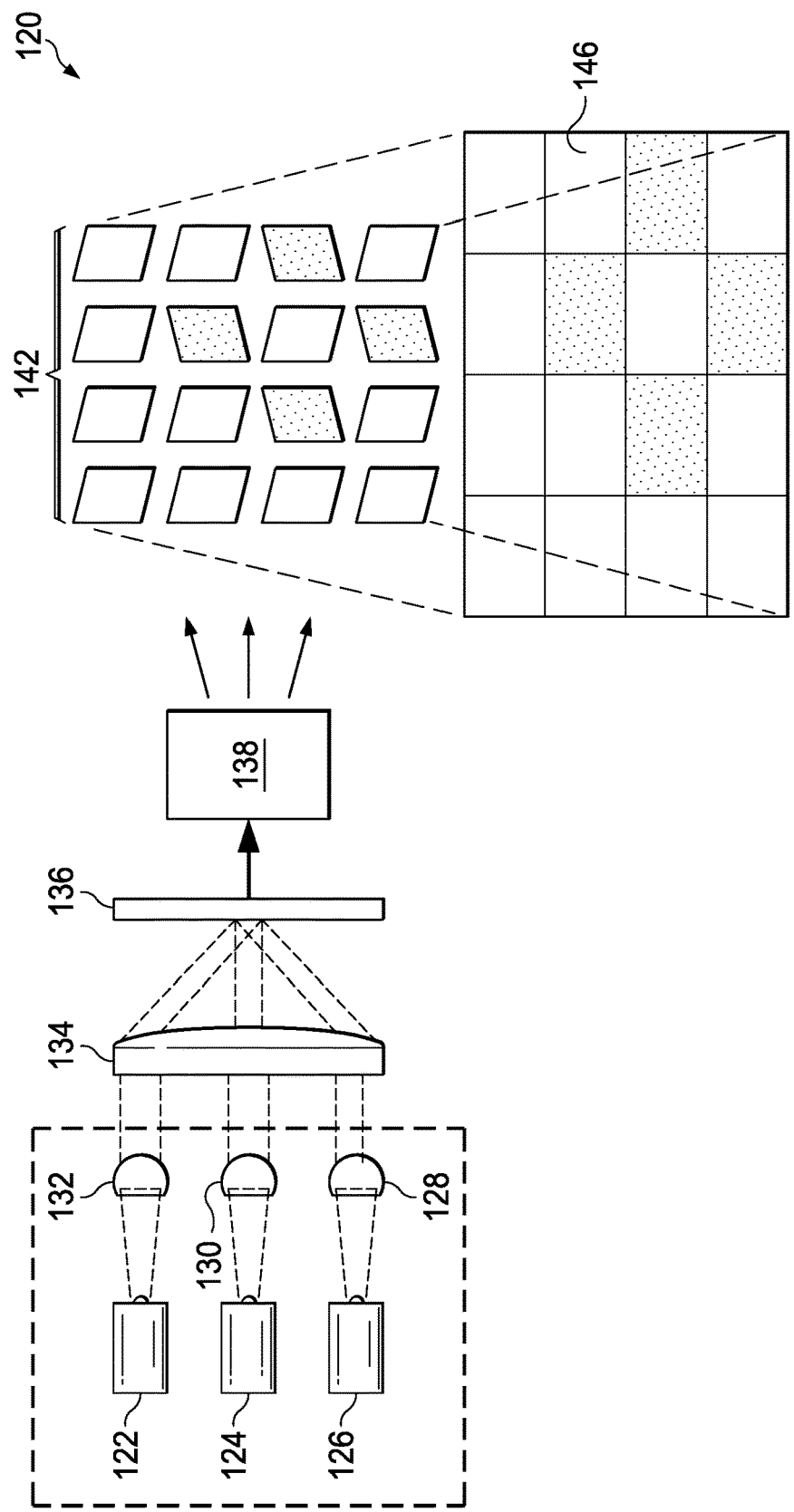
FIG. 12 illustrates in a block diagram the operation of a DMD illumination system incorporating arrangements of the present application to perform adaptive beam shaping.

FIG. 12 illustrates in a block diagram the operation of a DMD illumination system incorporating arrangements of the present application to perform adaptive beam shaping. FIG. 12 illustrates the system 120 of FIG. 11 with a different configuration to illustrate the use of beam shaping in the DMD. In FIG. 12, the laser sources 122, 124, and 126 again correspond to the left, center and right groups of laser sources, for example, as described above. In an alternative arrangement that forms an additional aspect of the present application, the three groups of laser sources can also correspond to a vertical arrangement and can be arranged as an upper, center and lower position laser source, respectively. In additional alternative arrangements that are also contemplated by the inventors and within the scope of the appended claims, the three laser sources can be replaced with a plurality of laser sources. These laser sources can be arranged in a grid or array arrangement, for example. Collimators 132, 130, 128 are associated with the laser sources and receive the laser outputs; and the collimators operate to make a non-divergent beam for each of the three (in this illustrative and non-limiting example) laser sources. Beam shaper 134 again directs the three beams to a phosphor 136. The pattern at the phosphor 136 is then transmitted by illumination optics 138 and presented to the DMD device 142. The output is shown projecting away from the DMD at plane 186.

In FIG. 12, certain micro-mirrors in the DMD 142 are shown in the "off" position while the remaining micro-mirrors are in the "on" position. The micro-mirrors in the "off" position in FIG. 12 will not transmit the incident light from the laser illumination sources to the projection system, thereby further shaping the resulting beam output by the projection system. In this manner, the intensity pattern output from the laser illumination sources can be further adapted and shaped using the individually addressable pixel elements of the DMD. In an automotive head lamp application example, a portion of the micro-mirrors can be placed in the "off" position when traffic is detected in an oncoming lane, thereby creating a "glare free" head lamp where the driver of an oncoming car does not have the illumination directed at his eyes. This beam shaping can be done adaptively and automatically using sensors and control circuitry to adapt the head lamp beam shape without the need for an action by the driver, freeing the driver to maintain their attention on the roadway and on operating the vehicle. Alternatively, in a further alternative arrangement that forms an additional aspect of the present application, a manual switch such as a foot feed switch could be used to switch the head lamp into a "low beam" or "glare free" mode when the driver observes a vehicle approaching in an oncoming lane. In one arrangement for an automobile head lamp, the beam is shaped so that a "high beam" brightness is provided in the direction the car is traveling, adaptively shaping the beam as the car turns, while a "glare free" adaptive shaping is also performed when oncoming traffic is detected, reducing the beam intensity and directing it away from the eyes of drivers in the opposing lanes, even while maintaining the high intensity elsewhere. In this manner a "glare free high beam" feature can be obtained, the beam intensity remaining high for the areas of interest away from the oncoming traffic, the beam shape being adaptively modified as the vehicle turns over curves, while still avoiding glare in the eyes of drivers in an oncoming lane of traffic.

Figure 13:
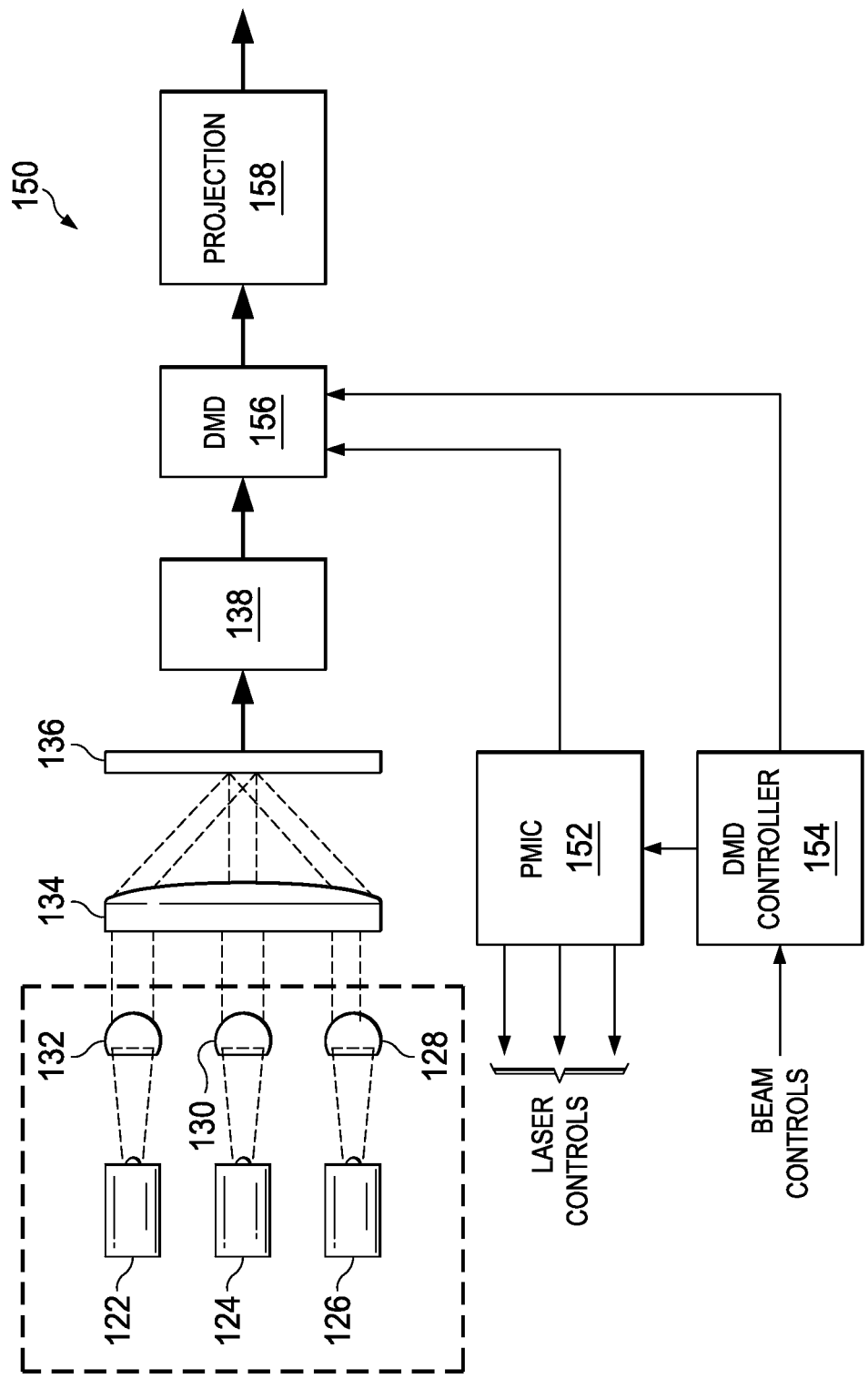
FIG. 13 further illustrates in a block diagram an arrangement of a DMD illumination system incorporating various arrangements that form additional aspects of the present application.

FIG. 13 further illustrates in a block diagram an arrangement of a DMD illumination system 150 incorporating various arrangements that form additional aspects of the present application. In FIG. 13 the groups of laser illumination sources 122, 124, 126 are again shown positioned to project light to collimators 132, 130, 128, and the collimators operate to make the laser output light non-divergent as it is input to the beam shaper 134. The beam shaper 134 then directs the laser output light onto the phosphor 136, where the phosphor emits light with the incident light from the lasers to form light with an intensity pattern corresponding to the laser intensities. The light is then transferred by illumination optics 138, preserving the laser intensity patterns, to the DMD 156.

In FIG. 13, DMD 156 is controlled by an integrated circuit or module 154 labeled "DMD Controller," which provides image data to the addressable pixels (the micro-mirrors) in DMD 156. A power management circuit 152, which can also be implemented as an integrated circuit or module, is coupled to signals from the DMD controller 154 and outputs signals labeled "LASER CONTROLS" in FIG. 13 that control the intensities from the laser sources. The power management IC 152 can also control the power to the DMD 156. Alternatively the power to the DMD 156 can be controlled by the DMD Controller 154. The DMD Controller 154 also receives as input signals labeled "BEAM CONTROLS".

The DMD Controller 154 may be, in one example arrangement, implemented as a DMD controller component that is specifically provided for use with a DMD device. Texas Instruments Incorporated offers various DMD controllers, for example, the DLPC300 Controller is provided to control the DLP3000 DMD device (also available from Texas Instruments Incorporated).

Alternative implementations for the DMD Controller 154 include controllers implemented as component parts such as commercially available DSPs, microprocessors, microcontrollers, and alternatives such as integrated or user programmable solutions including FPGAs, ASICs, CPLDs, state machines and the like. The controller can include firmware or software, or can be a pure hardware implementation. The controller 154 provides control signals to both the DMD device 156 in FIG. 13, and provides control to the power management IC PMIC 152, which provides the on and off signals to the laser illumination sources 122, 124, and 126.

In operation, in this example system 150, the DMD 156 has individually addressable micro-mirrors that are arranged to reflect light in two tilted positions. The first tilted position, which corresponds to the "on" state described above, is arranged so that light from the illumination optics 138 strikes the face of the DMD micro-mirrors, and is reflected out to the projection system 158.

In the example illustrative and non-limiting arrangement of FIG. 13, in operation, the laser illumination sources 122, 124, and 126 can be controlled by DMD controller 154 and the power management IC 152 to be pulsed on and off in a synchronous operation with pulse width modulation used to control the laser intensities. In an arrangement that is contemplated as an aspect of the present application, the pulses to the laser illumination sources can be operated in conjunction with the tilting operations of the DMD 156. The efficiency of the system 150 can be increased over prior known solutions because the illumination from laser sources 122, 124, and 126 is provided in coordination with the tilting operations of the DMD 156 so that the light directed away from the projection system 158, and into a light dump, is reduced or eliminated.

In another alternative arrangement, the laser illumination sources 122, 124 and 126 may be left on continuously and not pulsed, and current levels from the signals output by the power management IC 152 can be used to control the laser intensities. This alternative arrangement uses an approach that is simpler in terms of control signals needed.

Figure 14B:
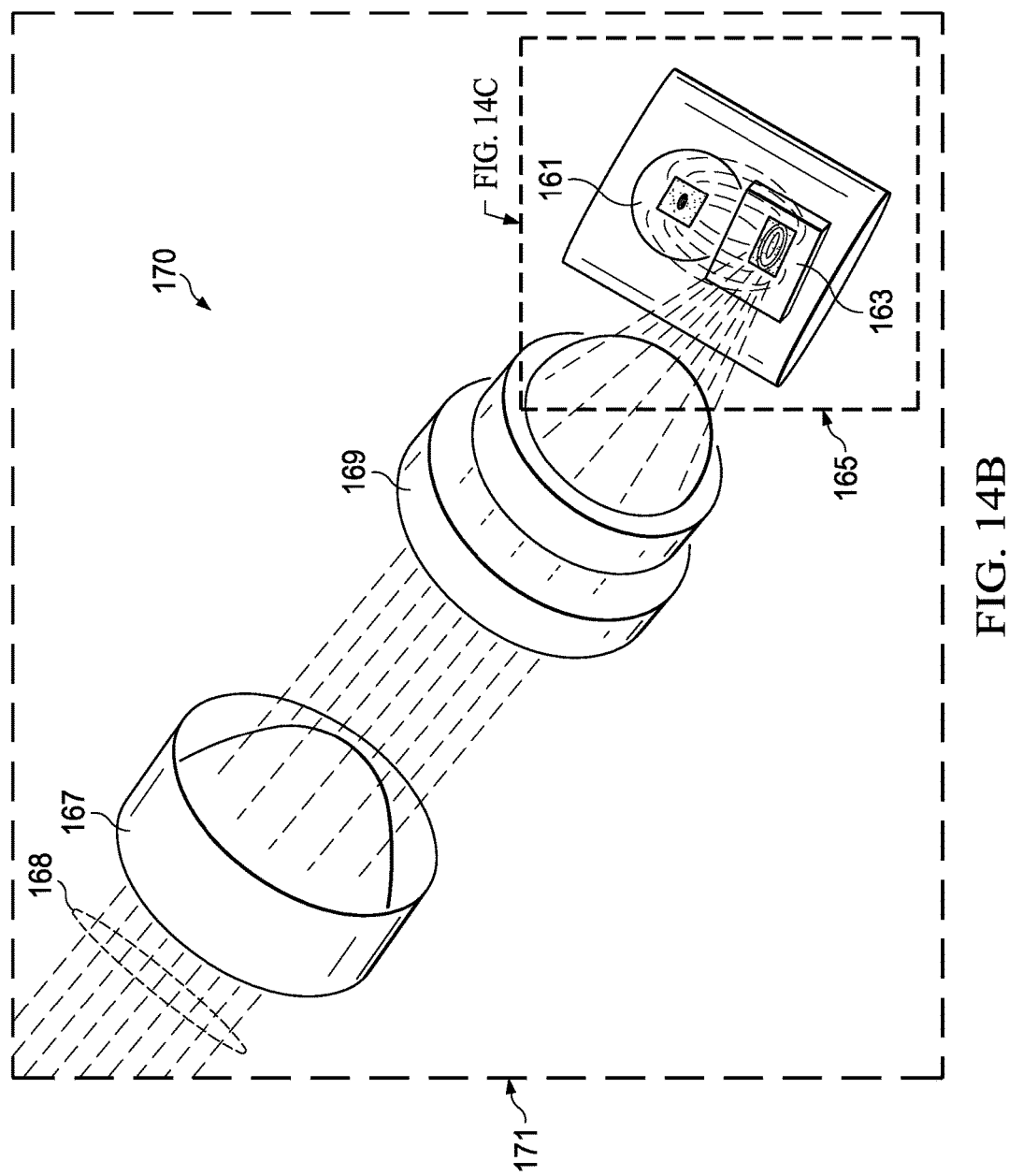
Figure 14C:
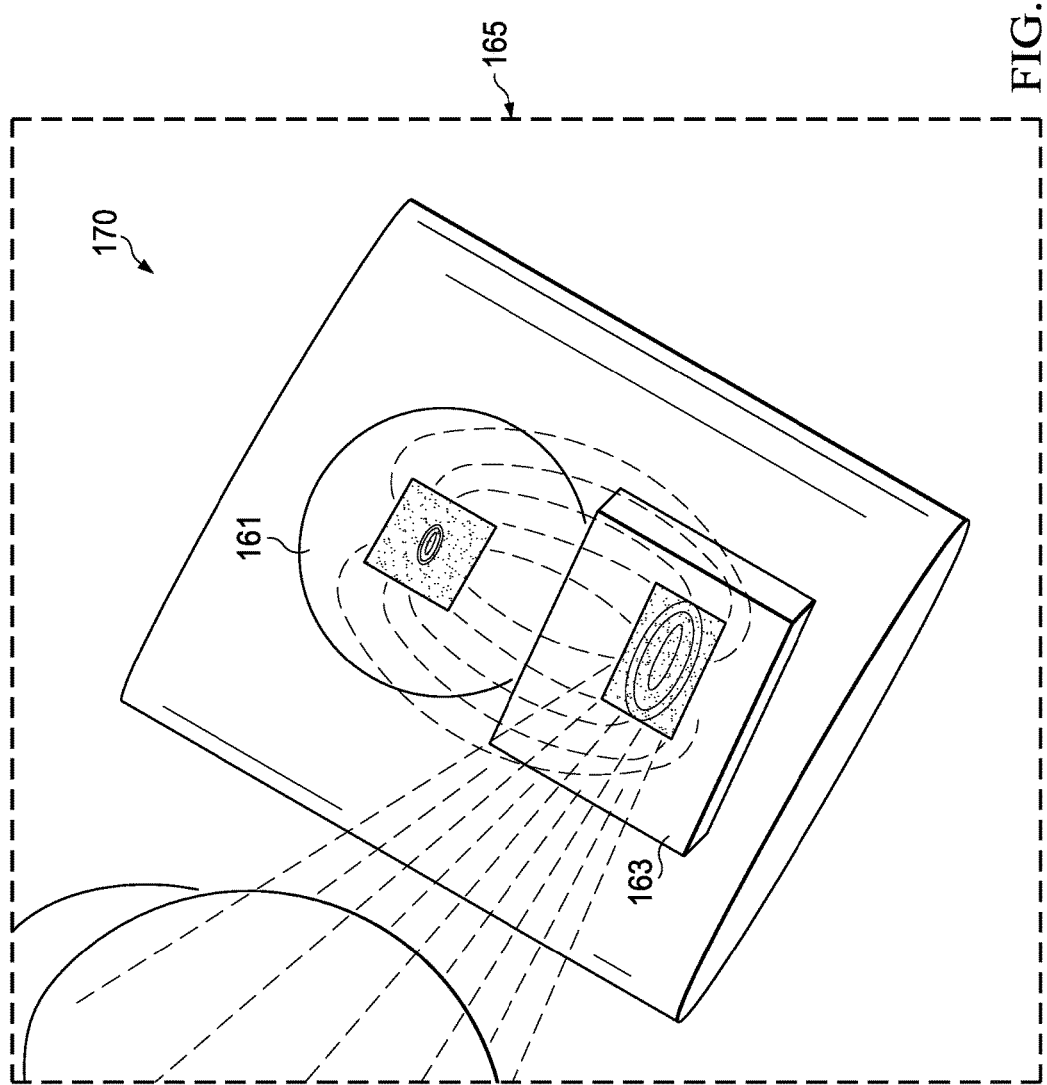

FIGS. 14A-C illustrate the operation of an example arrangement 170 that forms an aspect of the present application while projecting a first beam pattern onto a roadway, for example. In FIG. 14A, a beam with a peak closer to the center of the field of view of high light distribution is shown projected by a DMD headlight module 171. In FIG. 14B, in an expanded view of system 170, headlight lamp module 171 is shown with a DMD and illumination module 165 with a DMD 163 and a phosphor 161 shown reflecting light to a projection optics 169 and outputting the light through a lens 167. The final projection lens 167 can be optically powerful or just act as a transmission element or as a beam shaping element. In addition a cover 168 will be used as shown to protect the optics and the DMD from the elements. Example materials for cover 168 include transparent or semi-transparent plastic and glass as are commonly used for headlight covers. In FIG. 14C, system 170 and the DMD module 165 is shown in another expanded view, and the pattern output by the phosphor 161 is visible on the surface of the DMD 163, this pattern is then projected out of the system and in FIG. 14A, the pattern appears on the road as illustrated at a distance of, for example, 25 meters away.

Figure 15B:
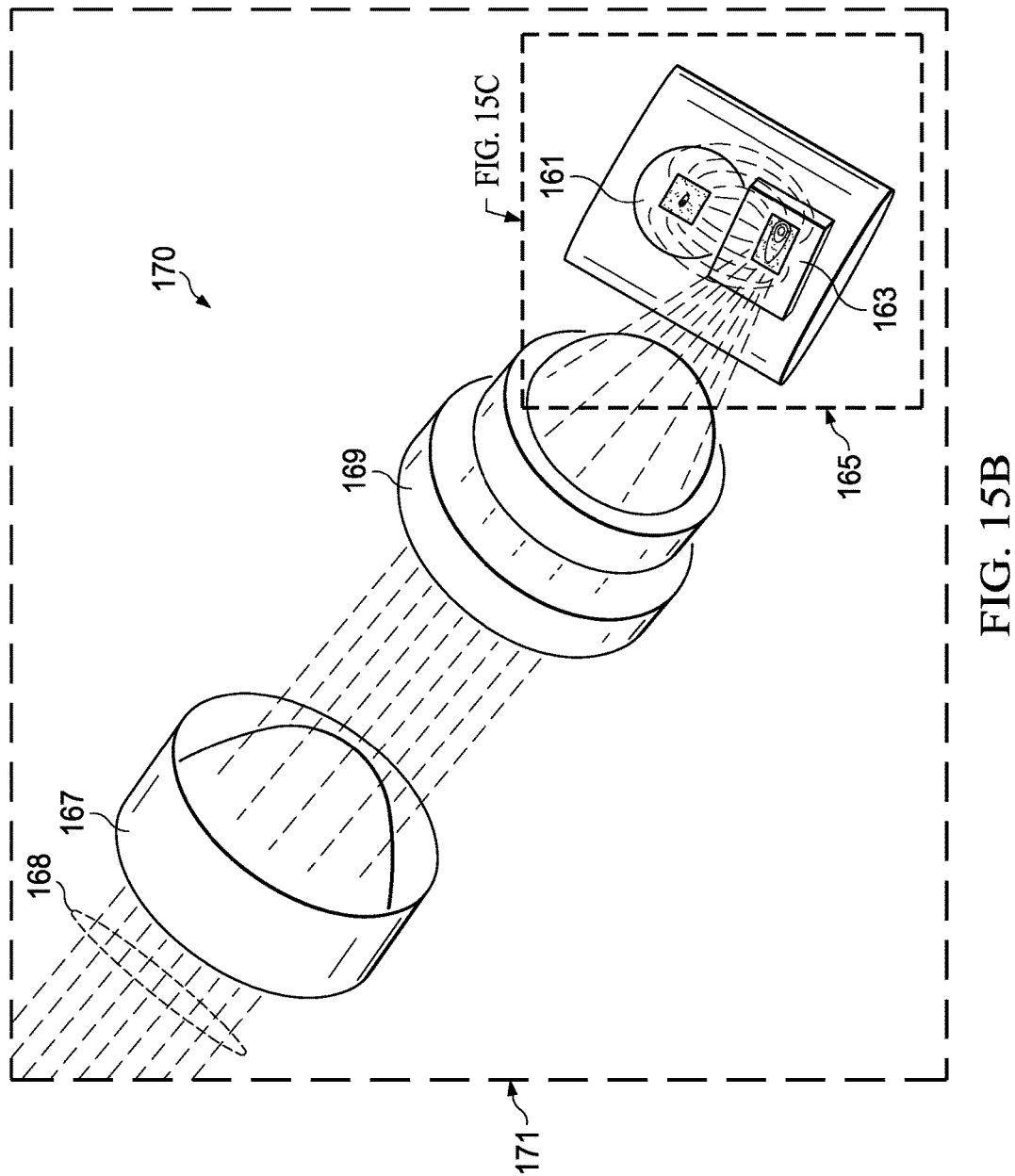
Figure 15C:
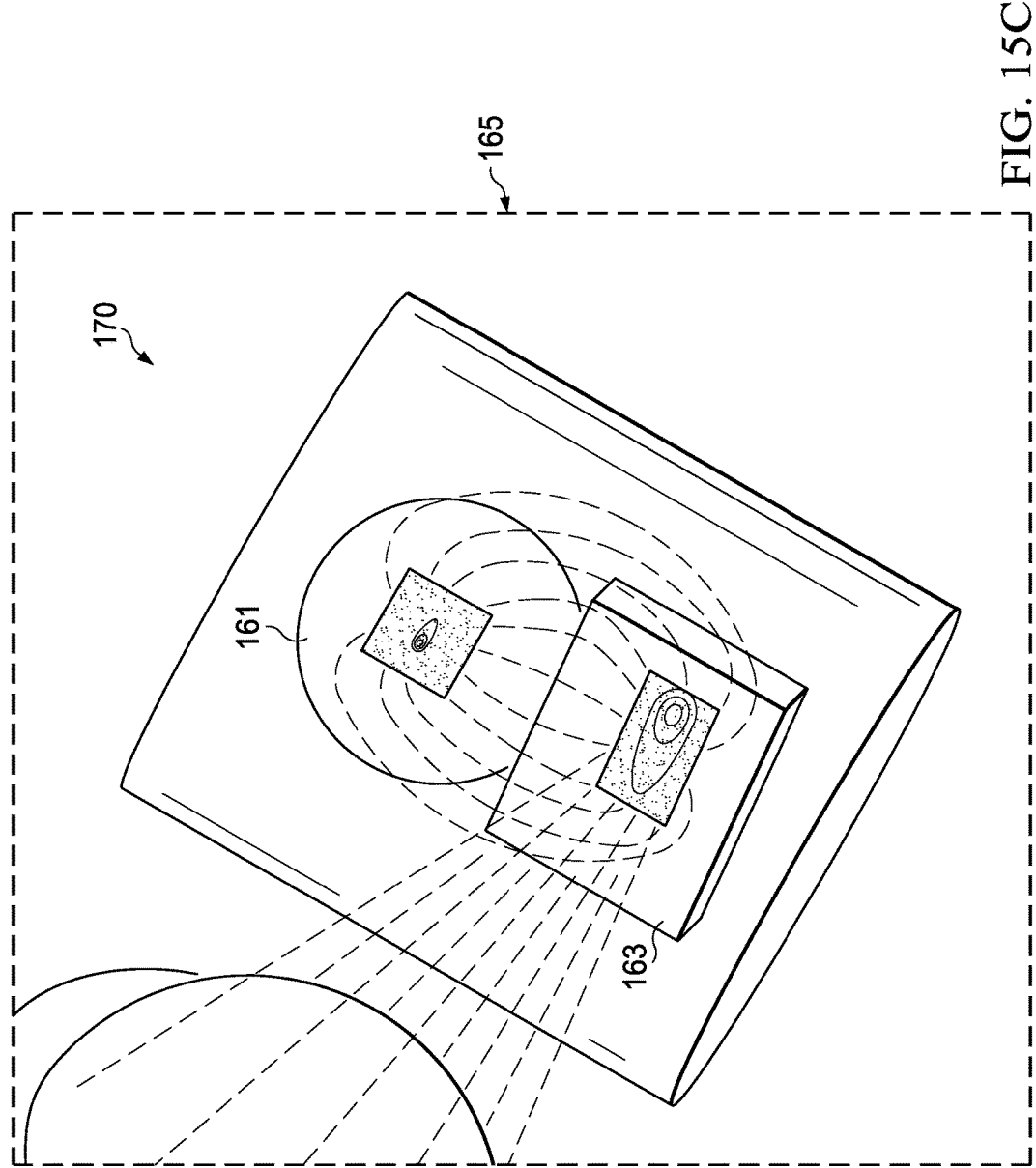

FIGS. 15A-C illustrate the operation of the example arrangement 170 of FIG. 14A in projecting a different shaped headlight beam. In FIG. 15A, the headlight module 171 including the arrangements described herein is shown projecting a different pattern onto the roadway at a distance of, for example, 25 meters. FIG. 15B illustrates the headlight module 171 and system 170 in an expanded view including the DMD module 165 with phosphor 161 again shown projecting a pattern onto the DMD 163 which is then reflected and output through projection optics 169 and 167 out of cover 168, and then projected by the headlight onto a road. FIG. 15C illustrates the system 170 and DMD module 165 in an expanded view including the phosphor 161 and the DMD 163 and depicts the pattern from the phosphor 161 projected onto the surface of the DMD 163. In FIG. 15A, the modified output pattern is shown at, for example, a 25 meters distance from the headlight module 171. In this operation, a beam with peak intensity shifted to a side of field of view when compared to that of FIGS. 14A-C is shown, the phosphor pattern has correspondingly shifted to a side (for example, a side away from the oncoming traffic in an automotive application), and the pattern is directed onto the DMD 163 and then reflected into the projection optics 169 before being projected onto the road. Using the laser illumination sources to adaptively change the pattern on the phosphor 161 in conjunction with using the DMD 163 to further shape the light beam enables a highly efficient and adaptive head lamp beam to be created, without the need of reflecting light into a light dump as in prior known solutions.

Advantages attained by use of the novel methods disclosed herein of using multiple laser illumination sources with the DMD include that the illumination system can output adaptively shaped beams in an efficient manner. The beam shaping is performed using both the laser illumination sources to form a pattern and further adapted by tilting some of the micro-mirrors in the DMD away from the illumination sources, to further refine and shape the beam output by the system.

In various arrangements that form additional aspects of the present application, different technology DMD devices may be used. Devices such as the "VSP" (very small pixel) technology DMD devices from Texas Instruments, Incorporated can be used. Currently VSP DMD devices are available, for example, as 0.3 inch diagonal arrays with WVGA resolution. An example commercially available part is the DLP3000, sold by Texas Instruments Incorporated, which has an array of 608×684 micrometer sized micro-mirrors, which is 415872 total mirrors. The DLP3000 device is known to be used in digital light projectors (DLP) for television and presentation video projectors, among other applications.

In another arrangement, TRP DMDS with micro-mirrors that move in a different manner can be used. These devices are available, for example, as part number DLP3114 available from Texas Instruments Incorporated. In the TRP technology, the micro-mirrors are formed on a compound hinge 80. The micro-mirrors tilt left horizontally in a first tilted position, and tilt downwards in a second tilted position. The TRP DMD micro-mirrors are oriented in an orthogonal array, and the hinge axis is diagonal and has compound motion, instead of vertical as in the VSP technology devices. In an example, a currently available device DLP3114 from Texas Instruments Incorporated has 1280× 720 micro-mirrors, or over 921600 pixel elements. This device provides 720p resolution. Other TRP devices offered by Texas Instruments, Incorporated will have over 1 million mirrors. A 0.47 inch array of TRP pixels offers 1080p resolution.

The examples of the VSP DMD and TRP DMD devices described above illustrate arrangements formed with DMD devices that are currently commercially available on the market from Texas Instruments Incorporated. However, the arrangements provided herein as aspects of the present application and the appended claims of this application are not so limited. Various DMD devices can be used in the arrangements.

In an example application, an automotive head lamp is implemented using the novel arrangements described above, and the projected beam can be adaptively modified. For example, in the automotive head lamp application, when oncoming traffic is detected as the car travels along a roadway; the adaptive light beam can be dipped lower and directed away from the eyes of the drivers in the oncoming traffic, while the overall brightness is maintained. Once the oncoming traffic passes the light beam can be returned to a normal pattern. These functions can be performed autonomously, freeing the car driver from the responsibility of manually switching from high-beam to low-beam positions, for example.

In additional arrangements, the profiles of the illumination sources can be varied, that is, the intensity of the laser illumination sources can be modified to create a desired intensity pattern and additional beam shaping and further adaptive beam shaping can be accomplished by using different DMD profiles to tilt selected mirrors "off" while others are "on" at the same time the intensity pattern is presented to the DMD device. The DMD device can therefore be used to fine tune or further refine the pattern created using intensity control of the laser illumination sources.

Use of the various arrangements of the present application advantageously provides an efficient DMD illumination system with adaptive beam capability, and robust and reliable operation that overcomes the deficiencies in the prior known solutions.

Although the example arrangements have been described in detail, it should be understood that various changes, substitutions and alterations can be made herein without departing from the spirit and scope of the application as defined by the appended claims.

Moreover, the scope of the present application is not intended to be limited to the particular arrangements of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding arrangements described herein may be utilized according to these arrangements and alternative arrangements. Accordingly, the appended claims are intended to include within their scope such processes, machines, manufacture, compositions of matter, means, methods, or steps.

What is claimed is:

1. A DMD illumination system, comprising:
   a plurality of laser illumination sources, including at least first and second laser illumination sources;

a digital micromirror device including an array of micromirrors;

a down converter material, arranged between the plurality of laser illumination sources and the digital micromirror device, to emit light when illuminated by one or more of the laser illumination sources, wherein: the first laser illumination source is arranged to illuminate only a first portion of the down converter material; the second laser illumination source is arranged to illuminate only a second portion of the down converter material; and the first and second portions are only partially overlapping; and control circuitry to apply control signals to the first and second laser illumination sources and to the digital micromirror device, for causing the first laser illumination source to adaptively vary a first power of illuminating the first portion of the down converter material while the second laser illumination source illuminates the second portion of the down converter material, for causing the second laser illumination source to adaptively vary a second power of illuminating the second portion of the down converter material while the first laser illumination source illuminates the first portion of the down converter material, and for selectively tilting the array of micromirrors to reflect a selected amount of the down converter material's emitted light for projection by the system, wherein the first power is different from the second power at various times.

2. The DMD illumination system of claim 1, wherein the first and second laser illumination sources have a visibly blue output.

3. The DMD illumination system of claim 1, wherein the down converter material comprises a phosphor.

4. The DMD illumination system of claim 1, wherein the down converter material is a phosphor module that emits yellow and white light when impacted by blue or UV light from one or more of the laser illumination sources, and a light resulting therefrom is visibly white.

5. The DMD illumination system of claim 4, wherein the phosphor module is one of: a reflective type; and a transmissive type.

6. The DMD illumination system of claim 1, wherein the plurality of laser illumination sources comprises at least three groups of laser illumination sources, including at least the first and second laser illumination sources.

7. The DMD illumination system of claim 6, wherein the at least three groups of laser illumination sources are arranged in a horizontal row to form respective left, center and right illumination sources.

8. The DMD illumination system of claim 6, wherein the at least three groups of laser illumination sources are arranged in a vertical column to form respective upper, center and lower illumination sources.

9. The DMD illumination system of claim 1, further comprising imaging optics, disposed between the down converter material and the digital micromirror device, to project the down converter material's emitted light onto the array of micromirrors.

10. The DMD illumination system of claim 1, further comprising projection optics to project the reflected light from the array of micromirrors out of the system.

11. The DMD illumination system of claim 10, wherein the projection optics comprise a cover of an automobile headlamp.

12. The DMD illumination system of claim 1, wherein the control circuitry is arranged to apply control signals to vary current to the first laser illumination source for causing the first laser illumination source to adaptively vary the first power.

13. The DMD illumination system of claim 1, wherein the control circuitry is arranged to apply control signals to pulse width modulate a power signal coupled to the first laser illumination source for causing the first laser illumination source to adaptively vary the first power.

14. A method of projecting light for illumination from a DMD device, the method comprising:
    directing light from a first laser illumination source onto only a first portion of a phosphor, the phosphor being one of: a reflective phosphor; and a transmissive phosphor;
    directing light from a second laser illumination source onto only a second portion of the phosphor, wherein the first and second portions are only partially overlapping;
    when the phosphor is illuminated by the first and second laser illumination sources, directing light emitted from the phosphor onto an array of micromirrors in a digital micromirror device;
    causing the first laser illumination source to adaptively vary a first power of illuminating the first portion of the phosphor while the second laser illumination source illuminates the second portion of the phosphor;
    causing the second laser illumination source to adaptively vary a second power of illuminating the second portion of the phosphor while the first laser illumination source illuminates the first portion of the phosphor, wherein the first power is different from the second power at various times; and
    selectively tilting the array of micromirrors to reflect a selected amount of the phosphor's emitted light for projection by a light projection system.

15. The method of claim 14, wherein causing the first laser illumination source to adaptively vary the power comprises varying current to the first laser illumination source.

16. The method of claim 14, wherein causing the first laser illumination source to adaptively vary the power comprises pulse width modulation of a power signal coupled to the first laser illumination source.

17. The method of claim 14, wherein directing light from the first laser illumination source comprises directing light in the blue visible light spectrum, and the phosphor emits yellow light in response thereto.

18. The method of claim 14, wherein directing light emitted from the phosphor comprises directing visibly white light.

19. The method of claim 14 wherein selectively tilting the array of micromirrors comprises causing a subset of the micromirrors to be in a first tilt position while a remainder of the micromirrors are in a second tilt position.

20. The method of claim 14, wherein the digital micromirror device comprises one selected from the group consisting essentially of: a tilt and roll pixel digital micromirror device; and a very small pixel digital micromirror device.

21. A laser illumination source DMD headlamp, comprising:
    a digital micromirror device including an array of micromirrors;
    a plurality of laser illumination sources, including at least first and second laser illumination sources;
    a phosphor, arranged between the plurality of laser illumination sources and the digital micromirror device, to emit light when illuminated by one or more of the laser illumination sources, wherein: the first laser illumination source is arranged to illuminate only a first portion of the phosphor; the second laser illumination source is arranged to illuminate only a second portion of the phosphor; and the first and second portions are only partially overlapping;

illumination optics, positioned between the phosphor and the array of micromirrors, to direct the phosphor's emitted light onto the array of micromirrors;

light projection optics to collect light reflected from the array of micromirrors and having a lens to project the collected light out of the DMD headlamp; and a controller to apply control signals to the first laser illumination source and to the digital micromirror device, for causing the first laser illumination source to adaptively vary a first intensity of illuminating the first portion of the phosphor while the second laser illumination source illuminates the second portion of the phosphor, for causing the second laser illumination source to adaptively vary a second intensity of illuminating the second portion of the phosphor while the first laser illumination source illuminates the first portion of the phosphor, and for selectively tilting the array of micromirrors to reflect a selected amount of the phosphor's emitted light for projection by the light projection optics, wherein the first intensity is different from the second intensity at various times.

22. The laser illumination source DMD headlamp of claim 21, wherein the controller is arranged to apply control signals to vary current to the first laser illumination source for causing the first laser illumination source to adaptively vary the first intensity.

23. The laser illumination source DMD headlamp of claim 21, wherein the controller is arranged to apply control signals to pulse width modulate a power signal coupled to the first laser illumination source for causing the first laser illumination source to adaptively vary the first intensity.

* * * * *